US011531343B1

(12) United States Patent
Kitchens et al.

(10) Patent No.: US 11,531,343 B1
(45) Date of Patent: Dec. 20, 2022

(54) SYSTEM FOR USER INTERACTIONS WITH AN AUTONOMOUS MOBILE DEVICE

(71) Applicant: AMAZON TECHNOLOGIES, INC., Seattle, WA (US)

(72) Inventors: Jessica Ann Kitchens, Berkeley, CA (US); Jonathan Ota, San Francisco, CA (US); Munaf Assaf, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 296 days.

(21) Appl. No.: 16/391,112

(22) Filed: Apr. 22, 2019

(51) Int. Cl.
*G05D 1/02* (2020.01)
*G05D 1/00* (2006.01)

(52) U.S. Cl.
CPC ......... *G05D 1/0212* (2013.01); *G05D 1/0088* (2013.01); *G05D 1/028* (2013.01); *G05D 1/0231* (2013.01)

(58) Field of Classification Search
CPC .. G05D 1/0212; G05D 1/0088; G05D 1/0231; G05D 1/028
See application file for complete search history.

(56) References Cited

U.S. PATENT DOCUMENTS

| | | | |
|---|---|---|---|
| 2007/0192910 A1* | 8/2007 | Vu | B25J 19/06 700/245 |
| 2018/0004207 A1* | 1/2018 | Michini | G08G 5/0069 |
| 2019/0041225 A1* | 2/2019 | Winkle | G01C 21/3453 |
| 2019/0212728 A1* | 7/2019 | Tahara | A63F 9/24 |
| 2019/0331501 A1* | 10/2019 | Wang | G05D 1/0274 |
| 2019/0351558 A1* | 11/2019 | Park | G08G 1/16 |
| 2019/0375106 A1* | 12/2019 | Lee | A61F 2/70 |
| 2020/0150655 A1* | 5/2020 | Artes | G05D 1/0016 |

OTHER PUBLICATIONS

Usnrl, Robots Playing Hide and Seek, 2013, https://www.youtube.com/watch?v=SQS0hcCgluc, herein "USNRL" (Year: 2013).*

* cited by examiner

*Primary Examiner* — Hunter B Lonsberry
*Assistant Examiner* — Matthew J. Reda
(74) *Attorney, Agent, or Firm* — Lindauer Law, PLLC

(57) ABSTRACT

A user interacts with an autonomous mobile device (AMD) using a voice user interface. The voice user interface allows a user to instruct the AMD to move, stop, go to a specified location, and so forth. The commands may include, but are not limited to: stop, stop moving, move, turn, go to, stay here, go away, and so forth. In one implementation, if the AMD is instructed by the user to go away, the AMD may move out of sight of the user from a first region to another region, such as another room. The AMD will avoid traversing the first region until a timer expires or a command to enter the first region is given.

20 Claims, 7 Drawing Sheets

600

| COMMAND LIBRARY 232 | | |
|---|---|---|
| INPUT DATA 128 | ACTION 602 | COMMAND DATA 132 |
| stop, halt | Stop movement of AMD (if moving), stop active task on AMD (if not moving). | <stop_movement> OR <stop.task> |
| stop moving | Stop all movement. | <cstop_movement> |
| turn <left/right/around> <angle> | Turn AMD as directed. If no angle specified then up to 90 degrees if no obstruction. Align display with chassis. | <turn, direction, angle> |
| move <front/back/left/right> <distance> | Move AMD as directed. If no distance specified then up to set distance if no obstruction. | <translate, direction, distance> |
| goto <location> | Move the AMD to the specified location. | <goto, location> |
| stay here | Limit to non-translational motion for default or specified time. | <stay_here, time> |
| go away / get out of here / disappear | Cease current task (if any). move to a location that is outside FOV of the user and remain out of the FOV for a period of time, path avoids user unless battery charge < threshold OR no alternative path. | <go_away, time> |

...

| COMMAND PRIORITY DATA 234 | | | |
|---|---|---|---|
| COMMAND DATA 132 | ACTIVE TASK 604 | INPUT SOURCE 606 | PRIORITY 608 |
| <stop_movement> | sentry | other device outside environment | 1 |
| <stop_movement> | sentry | AMD | 2 |
| <stop_movement> | any (except sentry) | AMD | 1 |
| <stop_movement> | any (except sentry) | other device in environment | 2 |
| <stop_movement> | any (except sentry) | other device outside environment | 3 |

SYSTEM FOR USER INTERACTIONS WITH AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 depicts a portion of a command library and command priority data, according to one implementation.

Figure 1:
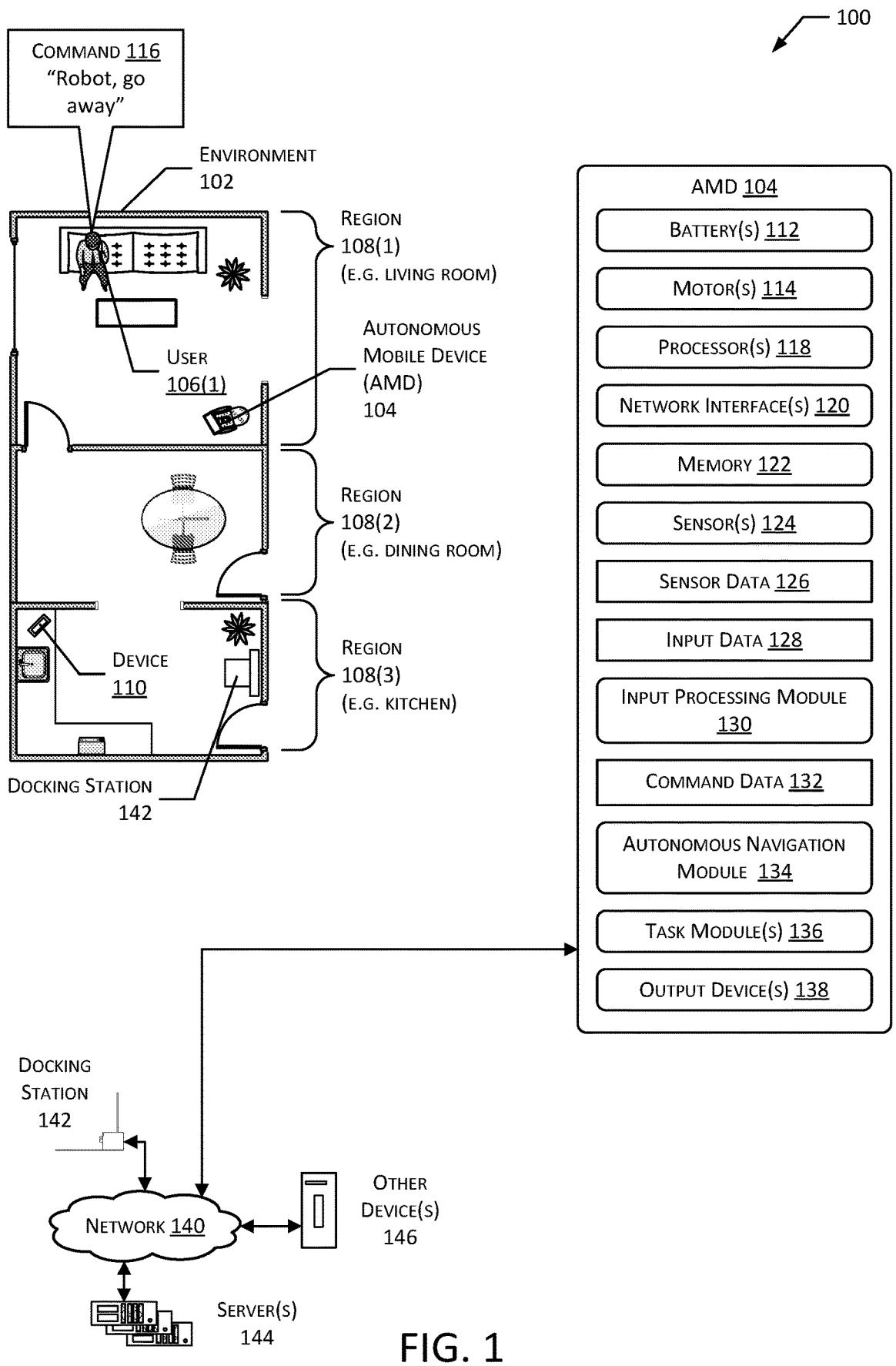
FIG. 1 illustrates a system that includes an autonomous mobile device (AMD) that accepts spoken commands via a voice user interface, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device (AMD) such as a robot may perform various tasks. The AMD is capable of autonomous movement, allowing it to move from one location in the environment to another without being "driven" or remotely controlled by a user. Some of the tasks the AMD performs may involve the AMD moving about an environment. During operation, the AMD may interact with the environment and the users in the environment. For example, the AMD may avoid a particular area, find a particular user, and so forth.

Sensors, such as those on the AMD or in the environment, acquire sensor data. The sensor data is processed to input data. For example, the sensor data may comprise raw audio data of an utterance or speech input by the user that is obtained from a microphone on the AMD. The raw audio data may be processed to determine input data indicative of a command. In other implementations the input data may be obtained from other sources. For example, input data may be received from a remote device being used by the user.

The command may then be used to control operation of the AMD. For example, the user may say "robot go away". The AMD may respond by performing a set of actions that are associated with the "go away" command. For example, the AMD may move to another room to a spot that is both out of sight of the user who uttered the "go away" command and is out of the way of expected traffic.

Some commands may take priority over others. For example, if the user issues a command to "go to the kitchen" and then a moment later issues a "stop" command, the AMD would process the stop command an immediately stop.

The AMD may attempt to comply with commands to the best extent possible. For example, a wall is 75 centimeters (cm) to the left of a present location of the AMD, and the user issues a command to "move left one meter". Continuing the example, the AMD may move to a destination location that is 15 cm from the wall. While responsive to the command, the AMD moves from the present location to the destination location autonomously. For example, the AMD determines a route used to move from the present location to the destination location.

The responsiveness of the AMD to commands from a user allows the AMD to more easily be incorporated into the environment and increases usefulness of the device. For example, the ability of the AMD to respond to spoken commands allows users to more naturally direct the AMD in the environment. For example, the phrasing of spoken commands do not require special training on the part of users in the environment. Instead of tediously programming the AMD, the users in the environment are able to go about their activities and direct the AMD in a convenient fashion.

Illustrative System

FIG. 1 illustrates a system 100 in which a physical environment 102 includes an autonomous mobile device (AMD) 104, according to some implementations. The environment 102 may include one or more users 106. The environment 102 may be divided into one or more regions 108. For example, a room within the environment 102 may be designated as a region 108. In this illustration, the environment 102 is shown with three regions: region 108(1) is a living room, region 108(2) is a dining room, and region 108(3) is a kitchen. In other situations, a single room may be divided into different regions 108, a single region may span several rooms, and so forth. A region 108 may comprise a contiguous area or a non-contiguous area. In some implementations a region 108 may be further subdivided into sub-regions. The AMD 104, the users 106, and so forth may move between regions 108, may interact with the AMD 104, the device 110, or both.

The environment 102 may include devices 110 such as network connected audio devices, network connected televisions, home automation controls, security systems, and so forth. For example, the devices 110 may include a network connected device that includes microphones and speakers which provides a voice user interface to various services.

The AMD 104 may include a battery(s) 112 to provide electrical power for operation of the AMD 104. The battery 112 may be rechargeable, allowing it to store electrical energy obtained from an external source. In other implementations a wireless power receiver may be used to provide power for operation of the AMD 104, recharge the battery 112, and so forth.

One or more motors 114 or other actuators enable the AMD 104 to move from one location in the environment 102 to another. For example, a motor 114 may be used to drive a wheel attached to a chassis of the AMD 104, which causes the AMD 104 to move. The AMD 104 may turn, move forward, move backward, and so forth.

During use, the user 106 may issue a command 116. For example, the user 106 may utter the command "robot, go away". In another example, the user 106 may indicate the command 116 using a computing device, such as a smartphone or tablet computer. Data indicative of the command 116 may then be provided to the AMD 104.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM). The AMD 104 may include one or more sensors 124. For example, the sensors 124 may include microphones, cameras, LIDAR, and so forth. The sensors 124 may generate sensor data 126. The sensors 124 are discussed in more detail with regard to FIG. 3.

During operation the AMD 104 may determine input data 128. The input data 128 may include sensor data 126 from the sensors 124 onboard the AMD 104. In one implementation, a speech processing module may process raw audio data obtained by a microphone on the AMD 104 and produce input data 128. For example, as illustrated the user 106 may say "robot, go away" which may produce input data 128 "go away".

The AMD 104 may utilize an input processing module 130 to use as input the input data 128 and determine command data 132. For example, the input data 128 is processed to determine if the command to "go away" is available to be performed at that time, and if so to generate the command data 132 that is then used to control operation of the AMD 104. Operation of the input processing module 130 is discussed in more detail with regard to FIG. 2.

In situations where the command data 132 is representative of a command that involves movement of the AMD 104, the command data 132 may be provided to an autonomous navigation module 134.

The autonomous navigation module 134 provides the AMD 104 with the ability to navigate within the physical environment 102 without real-time human interaction or constant supervision. The autonomous navigation module 134 may implement, or operate in conjunction with, a mapping module to determine an occupancy map or other representation of the physical environment 102. The autonomous navigation module 134 and the mapping module are discussed in more detail with regard to FIG. 2.

The AMD 104 autonomous navigation module 134 may generate path plan data that is indicative of a path through the environment 102 from a current location to a destination location. The path may comprise a plurality of locations or waypoints. The autonomous navigation module 134 may move the AMD 104 responsive to the command data 132. Continuing the example, the command data 132 indicative of the <go_away> may result in the autonomous navigation module 134 planning a path to a destination location that is in another region 108 and out of line of sight of a current location of the user 106 who issued the command 116.

The autonomous navigation module 134 may include an obstacle avoidance module. For example, if an obstacle is detected along a planned path, the obstacle avoidance module may re-route the AMD 104 to move around the obstacle or take an alternate path.

The AMD 104 may utilize one or more task modules 136. The task module 136 comprises instructions that, when executed, provide one or more functions associated with a particular task. For example, a survey task may direct the AMD 104 to travel throughout the physical environment 102 to generate an occupancy map. In another example, the task may direct the AMD 104 to find a particular user 106. In some implementations the task module(s) 136 may generate command data 132. Continuing the example, a task module 136 may issue command data 132 to go to a particular region 108, move to another location within a region 108, and so forth.

During operation, the AMD 104 may use one or more output devices 138, such as one or more of a speaker, display, projector, printer, and so forth. For example, the task module 136 may present content such as video on a display device of the AMD 104. The output devices 138 are discussed in more detail with regard to FIG. 3.

The AMD 104 may use the network interfaces 120 to connect to a network 140. For example, the network 140 may comprise a wireless local area network, that in turn is connected to a wide area network such as the Internet.

The AMD 104 may be configured to dock or connect to a docking station 142. The docking station 142 may also be connected to the network 140. For example, the docking station 142 may be configured to connect to the wireless local area network such that the docking station 142 and the AMD 104 may communicate. The docking station 142 may provide external power which the AMD 104 may use to charge the battery 112.

The AMD 104 may access one or more servers 144 via the network 140. For example, the AMD 104 may utilize a wake word detection module to determine if the user 106 is addressing a request to the AMD 104. The wake word detection module may hear a specified word or phrase and transition the AMD 104 or portion thereof to the wake operating mode. Once in the wake mode, the AMD 104 may then process at least a portion of the audio spoken by the user 106, or transfer the at least a portion of the audio to one or more servers 144 for further processing. The servers 144 may process the spoken audio and return to the AMD 104 data that may be subsequently used to operate the AMD 104.

The AMD 104 may also communicate with other devices 146. The other devices 146 may include the one or more devices 110 that are within the home or associated with operation of one or more devices 110 in the home. For example, the other devices 146 may include a doorbell camera, a garage door opener, a refrigerator, washing machine, and so forth. In some implementations the other devices 146 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
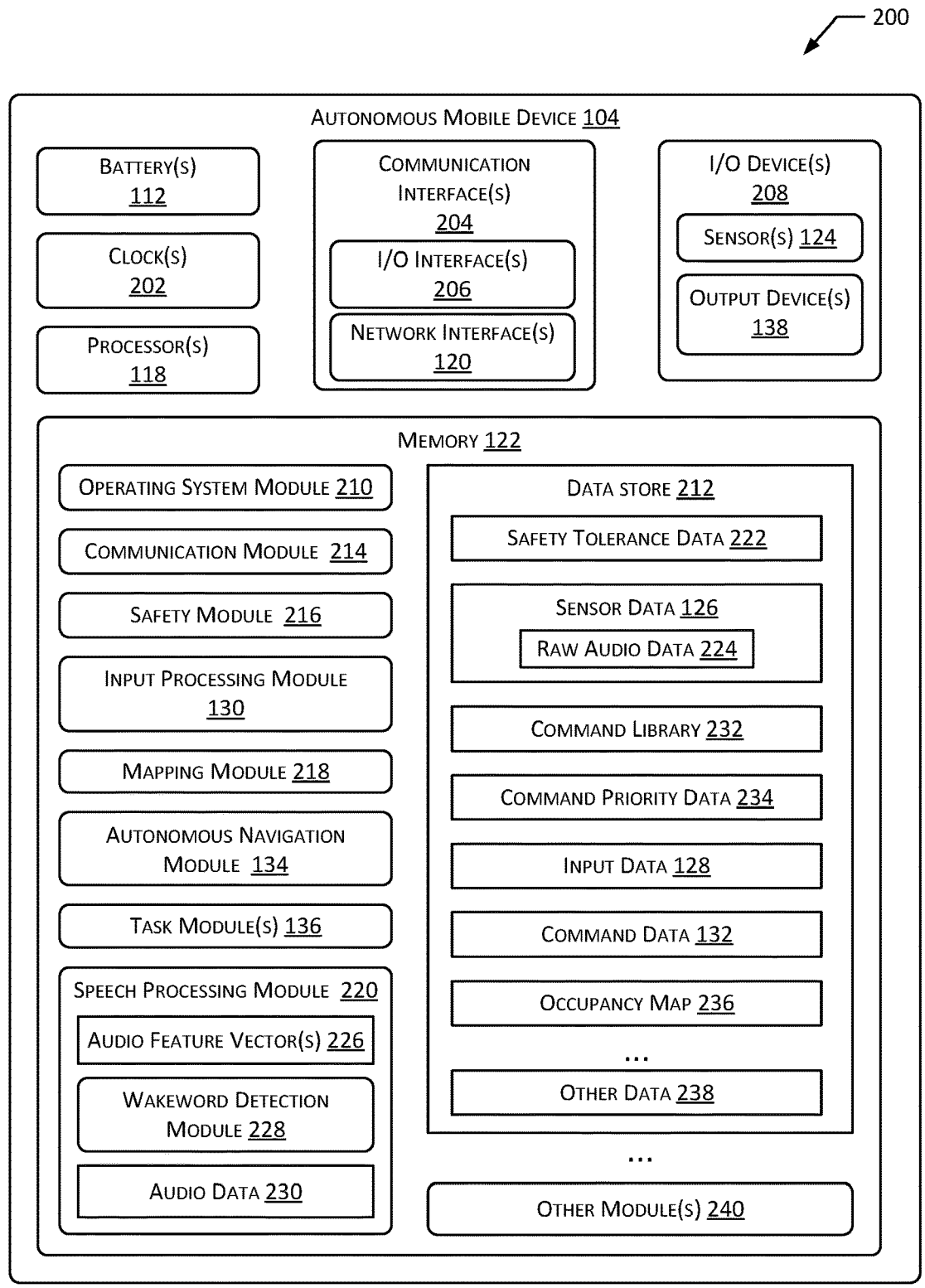
FIG. 2 is a block diagram of the components of the AMD, according to some implementations.

FIG. 2 is a block diagram 200 of the AMD 104, according to some implementations. The AMD 104 may include one or more batteries 112 to provide electrical power suitable for operating the components in the AMD 104. In some implementations other devices 146 may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signals processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 146 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 204 may couple to one or more I/O devices 208. The I/O devices 208 may include input devices such as one or more of a sensor 124, keyboard, mouse, scanner, and so forth. The I/O devices 208 may also include output devices 138 such as one or more of a motor 114, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 146 such as other AMDs 104, docking stations 142, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 146 including other AMDs 104, servers 144, network attached storage devices, and so forth.

A communication module 214 may be configured to establish communication with other devices 146, such as other AMDs 104, an external server 144, a docking station 142, and so forth. The communications may be authenticated, encrypted, and so forth.

Other modules within the memory 122 may include a safety module 216, the input processing module 130, a mapping module 218, the autonomous navigation module 134, the one or more task modules 136, a speech processing module 220, or other modules 240. The modules may access data stored within the data store 212, including safety tolerance data 222, sensor data 126, a command library 232, command priority data 234, the input data 128, command data 132, or other data 238.

The safety module 216 may access the safety tolerance data 222 to determine within what tolerances the AMD 104 may operate safely within the physical environment 102. For example, the safety module 216 may be configured to stop the AMD 104 from moving when the extensible mast is extended. In another example, the safety tolerance data 222 may specify a minimum sound threshold which, when exceeded, stops all movement of the AMD 104. Continuing this example, detection of sound such as a human yell would stop the AMD 104. In another example, the safety module 216 may access safety tolerance data 222 that specifies a minimum distance from an object that the AMD 104 may maintain. Continuing this example, when a sensor 124 detects an object has approached to less than the minimum distance, all movement of the AMD 104 may be stopped. Movement of the AMD 104 may be stopped by one or more of inhibiting operations of one or more of the motors, issuing a command to stop motor operation, disconnecting power from one or more of the motors, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The input processing module 130 may access sensor data 126 that is acquired from one or more the sensors 124. The input processing module 130 may process the sensor data 126 to determine the input data 128. The input processing module 130 may provide various processing functions such as de-noising, filtering, change detection, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data 238. For example, the ANN may be a trained using a supervised learning algorithm such that object identifiers are associated with images of particular objects within training images provided to the ANN. Once trained, the ANN may be provided with the sensor data 126 and produce output indicative of the object identifier.

In some implementations the input processing module 130 may use the speech processing module 220 as described below.

The mapping module 218 is used to generate an occupancy map 236 that is representative of the physical features in the environment 102. For example, one or more cameras may obtain image data of the environment 102. The image data may be processed to determine the presence of obstacles. The occupancy map 236 may comprise data that indicates the location of one or more obstacles, such as a table, wall, and so forth. In some implementations, the occupancy map 236 may comprise a plurality of cells with each cell of the plurality of cells representing a particular area in the environment 102. Data may be stored that indicates whether that cell contains an obstacle. An obstacle may comprise an object or feature that prevents or impairs traversal of the AMD 104. For example, an obstacle may comprise a wall, stairwell, and so forth. With regard to the occupancy map 236, a region 108 may be comprised of cells.

The occupancy map 236 may be manually or automatically determined. For example, during a learning phase the user 106 may take the AMD 104 on a tour of the environment 102, allowing the AMD 104 to generate the occupancy map 236 and associated data, such as tags designating a particular region 108, such as "kitchen" or "living room". In another example, during subsequent operation the AMD 104 may generate the occupancy map 236 that is indicative of locations of obstacles such as chairs, doors, stairwells, and so forth as it moves unattended through the environment 102.

In some implementations, the occupancy map 236 may include floor characterization data. The floor characterization data is indicative of one or more attributes of the floor at a particular location within the physical environment 102. During operation of the AMD 104, floor characterization data may be obtained. The floor characterization data may be utilized by one or more of the safety module 216, the autonomous navigation module 134, the task module 136, or other modules 240. For example, the floor characterization data may be used to determine if an unsafe condition occurs such as a wet floor. In another example, the floor characterization data may be used by the autonomous navigation module 134 to assist in the determination of the current location of the AMD 104 within the home. For example, if the autonomous navigation module 134 determines that the AMD 104 is located in the dining room, but the floor characterization data indicates that the floors are consistent with the living room, an error condition may be generated in which other techniques are used to determine the location of the AMD 104 or otherwise resolve the difference. For example, the AMD 104 may attempt to return to the docking station 142 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 106. For example, the AMD 104 may use speech synthesis to ask the user 106 "what room is this?" during a training phase. The utterance or speech input of the user 106 may be received by the microphone array and the audio data "this is the living room" may be processed and subsequently used to generate the location designator.

The autonomous navigation module 134 provides the AMD 104 with the ability to navigate within the physical environment 102 without real-time human interaction. The autonomous navigation module 134 may implement, or operate in conjunction with, the mapping module 218 to determine the occupancy map 236 or other representation of the physical environment 102. In one implementation, the mapping module 218 may use one or more simultaneous localization and mapping ("SLAM") techniques. The SLAM algorithms may utilize one or more of maps, algorithms, beacons, or other techniques to provide navigational data. The navigational data may then be used to determine the path plan data which is then subsequently used to determine a set of commands that drive the motors connected to the wheels. For example, the autonomous navigation module 134 may determine a location within the environment 102, estimate a path to a destination, and so forth.

The AMD 104 autonomous navigation module 134 may generate path plan data that is indicative of a path through the environment 102 from a current location to a destination. The autonomous navigation module 134 may use data indicative of a current location and accept the wait location data as a destination, and then determine the path plan data that describes the path to the wait location.

The autonomous navigation module 134 may include an obstacle avoidance module. For example, if an obstacle is detected along a planned path, the obstacle avoidance module may re-route the AMD 104 to move around the obstacle or take an alternate path.

The autonomous navigation module 134 may utilize various techniques during processing of sensor data 126. For example, image data obtained from cameras on the AMD 104 may be processed to determine one or more of corners, edges, planes, and so forth. In some implementations corners may be detected and the coordinates of those corners may be used to produce point cloud data. This point cloud data may then be used for SLAM or other purposes associated with mapping, navigation, and so forth.

The autonomous navigation module 134 may be used to move the AMD 104 from a first location to a second location within the physical environment 102. This movement may be responsive to a determination made by an onboard processor 118, in response to the command data 132 received from one or more communication interfaces 204, as determined from the sensor data 126, and so forth. For example, an external server 144 may send command data 132 that is subsequently received using a network interface 120. This command data 132 may direct the AMD 104 to proceed to a designated destination, such as "living room" or "dining room". The AMD 104 may then process this command and use the autonomous navigation module 134 to determine the directions and distances associated with reaching the specified destination.

The speech processing module 220 may be used to process speech input or utterances of the user 106. Microphones may acquire audio in the presence of the AMD 104 and may send raw audio data 224 to an acoustic front end (AFE). The AFE may transform the raw audio data 224 (for example, a single-channel, 16-bit audio stream sampled at 16 kHz), captured by the microphone, into audio feature vectors 226 that may ultimately be used for processing by various components, such as a wakeword detection module 228, speech recognition engine, or other components. The AFE may reduce noise in the raw audio data 224. The AFE may also perform acoustic echo cancellation (AEC) or other operations to account for output audio data that may be sent to a speaker of the AMD 104 for output. For example, the AMD 104 may be playing music or other audio that is being received from a network 140 in the form of output audio data. To avoid the output audio interfering with the device's ability to detect and process input audio, the AFE or other component may perform echo cancellation to remove the output audio data from the input raw audio data 224, or other operations.

The AFE may divide the raw audio data 224 into frames representing time intervals for which the AFE determines a number of values (i.e., features) representing qualities of the raw audio data 224, along with a set of those values (i.e., a feature vector or audio feature vector 226) representing features/qualities of the raw audio data 224 within each frame. A frame may be a certain period of time, for example a sliding window of 25 ms of audio data 230 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 224, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 226 (or the raw audio data 224) may be input into a wakeword detection module 228 that is configured to detect keywords spoken in the audio. The wakeword detection module 228 may use various techniques to determine whether audio data 230 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 228 to perform wakeword detection to determine when a user 106 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 228 may compare audio data 230 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 230 (which may include one or more of the raw audio data 224 or the audio feature vectors 226) to one or more server(s) 144 for speech processing. The audio data 230 corresponding to audio obtained by the microphone may be processed locally on one or more of the processors 118, sent to a server 144 for routing to a recipient device or may be sent to the server 144 for speech processing for interpretation of the included speech (either for purposes of enabling voice-communications and/or for purposes of executing a command in the speech). The audio data 230 may include data corresponding to the wakeword, or the portion of the audio data 230 corresponding to the wakeword may be removed by the AMD 104 before processing by the input processing module 130, prior to sending to the server 144, and so forth.

The speech processing module 220 may include or access an automated speech recognition (ASR) module. The ASR module may accept as input raw audio data 224, audio feature vectors 226, or other sensor data 126 and so forth and may produce as output the input data 128 comprising a text string or other data representation. The input data 128 comprising the text string or other data representation may be processed by the input processing module 130 using the command library 232 to determine the command data 132. For example, the utterance of the command 116 "robot, go away" may result in input data 128 comprising the text string "go away". The wakeword "robot" may be omitted from the input data 128.

The input processing module 130 uses the input data 128, the command library 232, and in some implementations the command priority data 234, to determine command data 132. The command library 232 provides an association between available input data 128 and corresponding actions that are associated with command data 132 that then is used to instruct the AMD 104. The command library 232 is discussed with regards to FIG. 6. The command priority data 232 may specify the precedence of particular command data 132.

In some implementations the input data 128, the command data 132, or a combination thereof may be provided to one or more of the task modules 136.

The AMD 104 may connect to the network 140 using one or more of the network interfaces 120. In some implementations, one or more of the modules or other functions described here may execute on the processors 118 of the AMD 104, on the server 144, or a combination thereof. For example, one or more servers 144 may provide various functions, such as ASR, natural language understanding (NLU), providing content such as audio or video to the AMD 104, and so forth.

The other modules 240 may provide other functionality, such as object recognition, speech synthesis, user identification, and so forth. The other modules 240 may comprise a speech synthesis module that is able to convert text data to human speech. For example, the speech synthesis module may be used by the AMD 104 to provide speech that a user 106 is able to understand.

The data store 212 may store the other data 238 as well. For example, localization settings may indicate local preferences such as language. User identifier data may be stored that allows for identification of a particular user 106.

Figure 3:
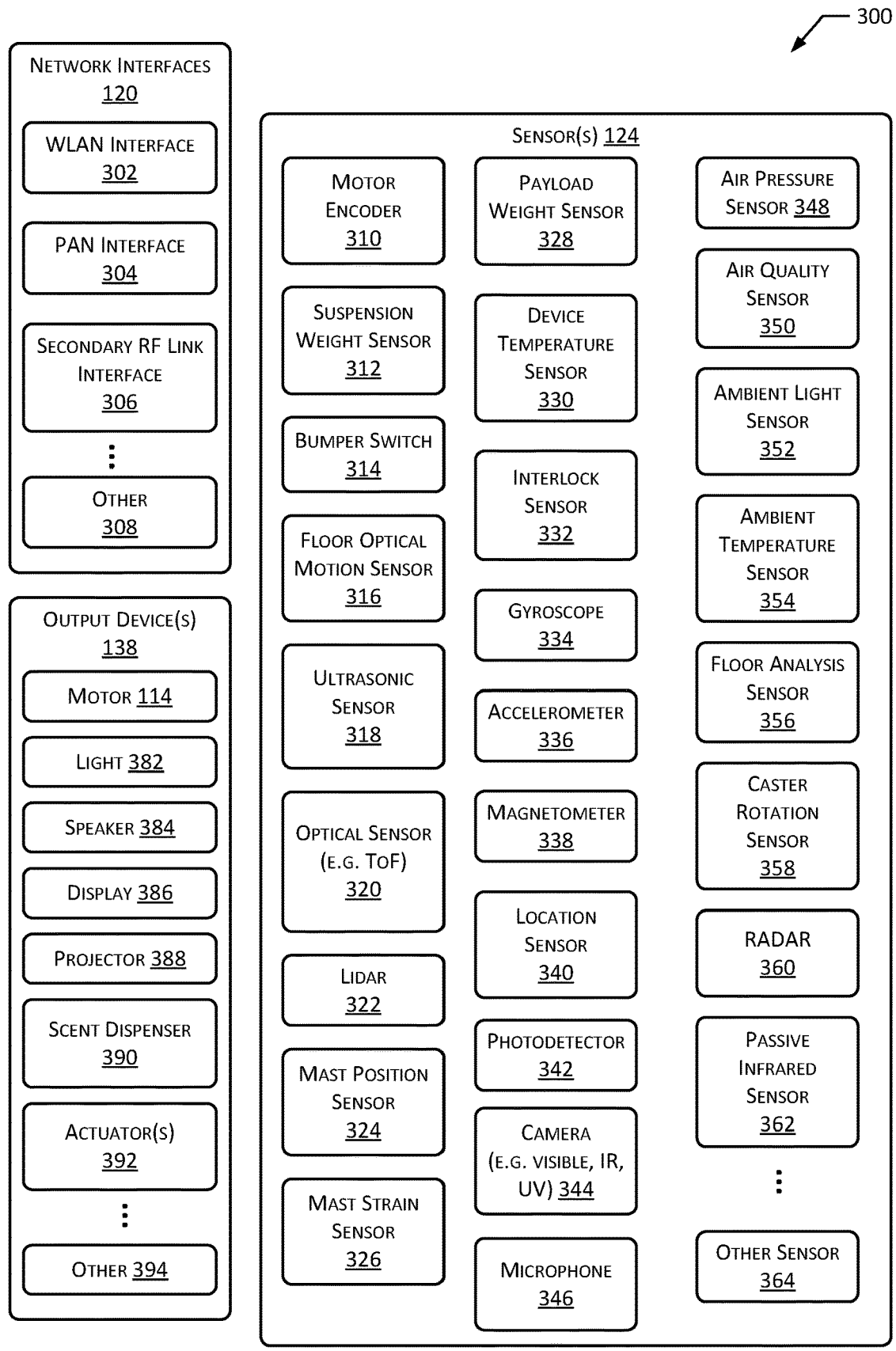
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 138, according to some implementations. The components illustrated here are provided by way of illustration and not necessarily as a limitation. For example, the AMD 104 may utilize a subset of the particular network interfaces 120, output devices 138, or sensors 124 depicted here, or may utilize components not pictured. One or more of the sensors 124, output devices 138, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 146 in the event that communication fails using one or more of the WLAN interface 302 or the PAN interface 304. For example, in the event the AMD 104 travels to an area within the physical environment 102 that does not have Wi-Fi coverage, the AMD 104 may use the secondary RF link interface 306 to communicate with another device such as a specialized access point, docking station 142, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor. The motor 114 may comprise a rotary motor, or a linear actuator. In some implementations, the motor encoder 310 may comprise a separate assembly such as a photodiode and encoder wheel that is affixed to the motor 114. In other implementations, the motor encoder 310 may comprise circuitry configured to drive the motor 114. For example, the autonomous navigation module 134 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 114. For example, if the suspension weight sensor 312 indicates no weight on the suspension, the implication is that the AMD 104 is no longer resting on its wheels, and thus operation of the motors 114 may be inhibited. In another example, if the suspension weight sensor 312 indicates weight that exceeds a threshold value, the implication is that something heavy is resting on the AMD 104 and thus operation of the motors 114 may be inhibited.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motions of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 134 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 134 may utilize point cloud data generated by the lidar 322 for localization of the AMD 104 within the physical environment 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 112, one or more motors 114, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user 106 communication, and so forth. For example, a pair of cameras 344 sensitive to infrared light may be mounted on the front of the AMD 104 to provide binocular stereo vision, with the sensor data 126 comprising images being sent to the autonomous navigation module 134. In another example, the camera 344 may comprise a 10 megapixel or greater camera that is used for videoconferencing or for acquiring pictures for the user 106.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 134 may be acquired using a rolling shutter and subsequently may be processed to mitigate image artifacts.

One or more microphones 346 may be configured to acquire information indicative of sound present in the physical environment 102. In some implementations, arrays of microphones 346 may be used. These arrays may implement beamforming techniques to provide for directionality of gain. The AMD 104 may use the one or more microphones 346 to acquire information from acoustic tags, accept voice input from users 106, determine ambient noise levels, for voice communication with another user 106 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient environment 102 proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 134, the task module 136, and so forth. For example, if the floor analysis sensor 356 determines that the floor is wet, the safety module 216 may decrease the speed of the AMD 104 and generate a notification alerting the user 106.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 may be used to detect the presence of users 106, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical environment 102 to provide landmarks for the autonomous navigation module 134. One or more touch sensors may be utilized to determine contact with a user 106 or other objects.

The AMD 104 may include one or more output devices 138. A motor 114 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on the surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 106. Continuing the example, a motor 114 with an eccentric weight may be used to create a buzz or vibration to allow the AMD 104 to simulate the purr of a cat.

Figure 4:
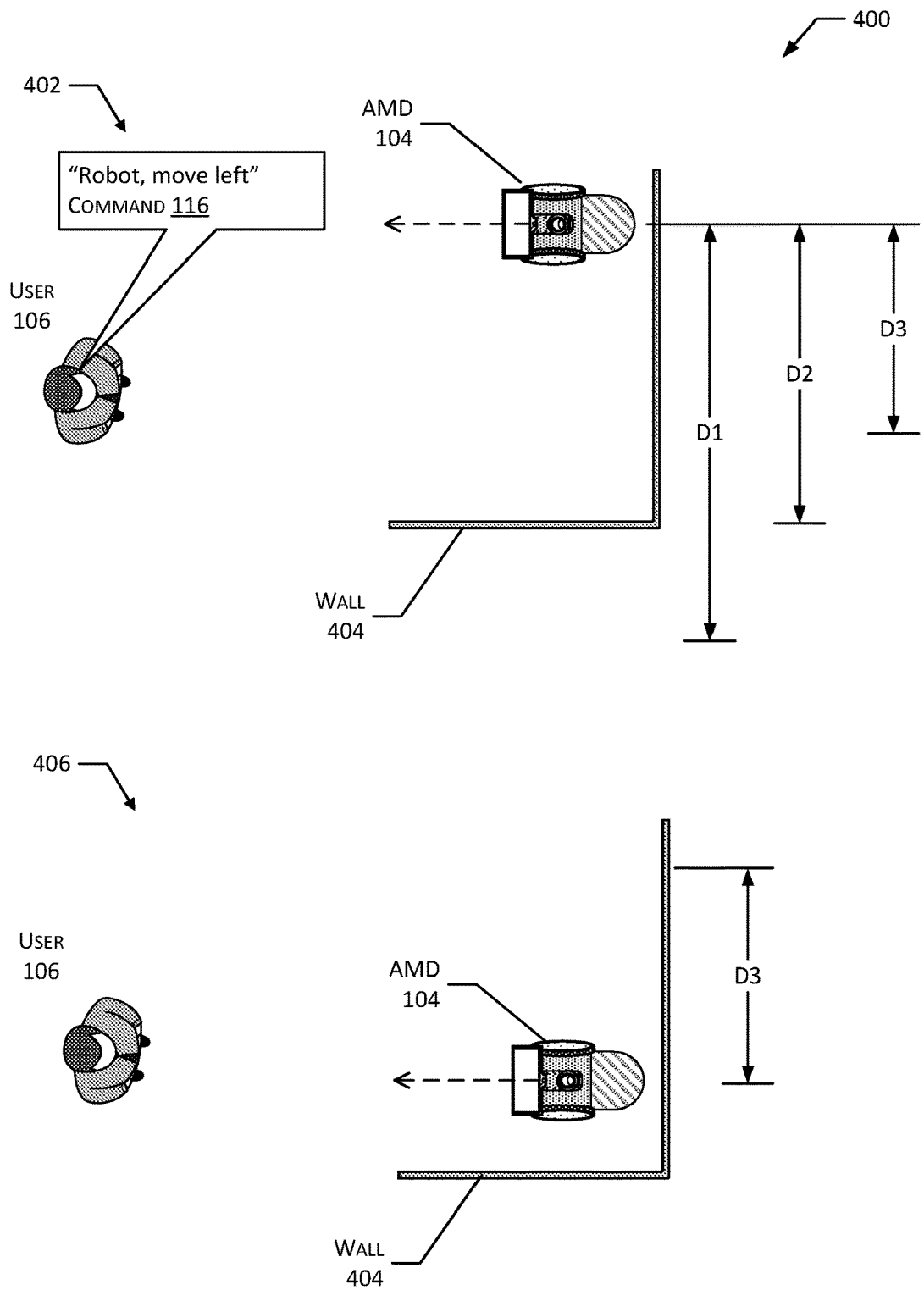
FIG. 4 depicts an AMD complying with a spoken command when constrained by an obstacle, according to some implementations.

FIG. 4 depicts at 400 an AMD 104 complying with a spoken command 116 when constrained by an obstacle, according to some implementations. The AMD 104 may be configured to attempt to comply with a command 116 to the extent possible in the circumstances.

At 402 the user 106 has issued a command 116 for "move left". As no distance is specified, the command library 232 may define a default distance D1, such as 1 meter. However, a wall 404 presents an obstacle at distance D2. As a result, it is impossible for the AMD 104 to comply and move the exact distance D1.

At 406, responsive to command data 132 indicative of <move_left, distance=1.0) the autonomous navigation module 134 has moved the AMD 104 to the left of the original location by a distance D3. The wall 404 was detected and the AMD 104 moves as close to the wall 406 as permitted by internal collision avoidance limits. As a result, the actual distance D3 between the original location and the destination location is less than the default or specified distance of D1.

In some implementations a minimum possible movement may be specified. If this minimum possible movement cannot be complied with, no action may be taken. For example, if the AMD 104 is positioned close to the wall 404 as shown in 406 and the user 106 again issues the command 116 "move left", the AMD 104 would not move as it is not permitted by collision avoidance limits to approach the wall 404 any closer.

While the example depicted includes translation of the AMD 104, such operations may also be applied to rotation or other movements of the AMD 104 or affiliated components. For example, if the user 106 issues a command 116 to raise and extensible mast while the AMD 104 is underneath another object, the command 116 may be declined.

Figure 5:
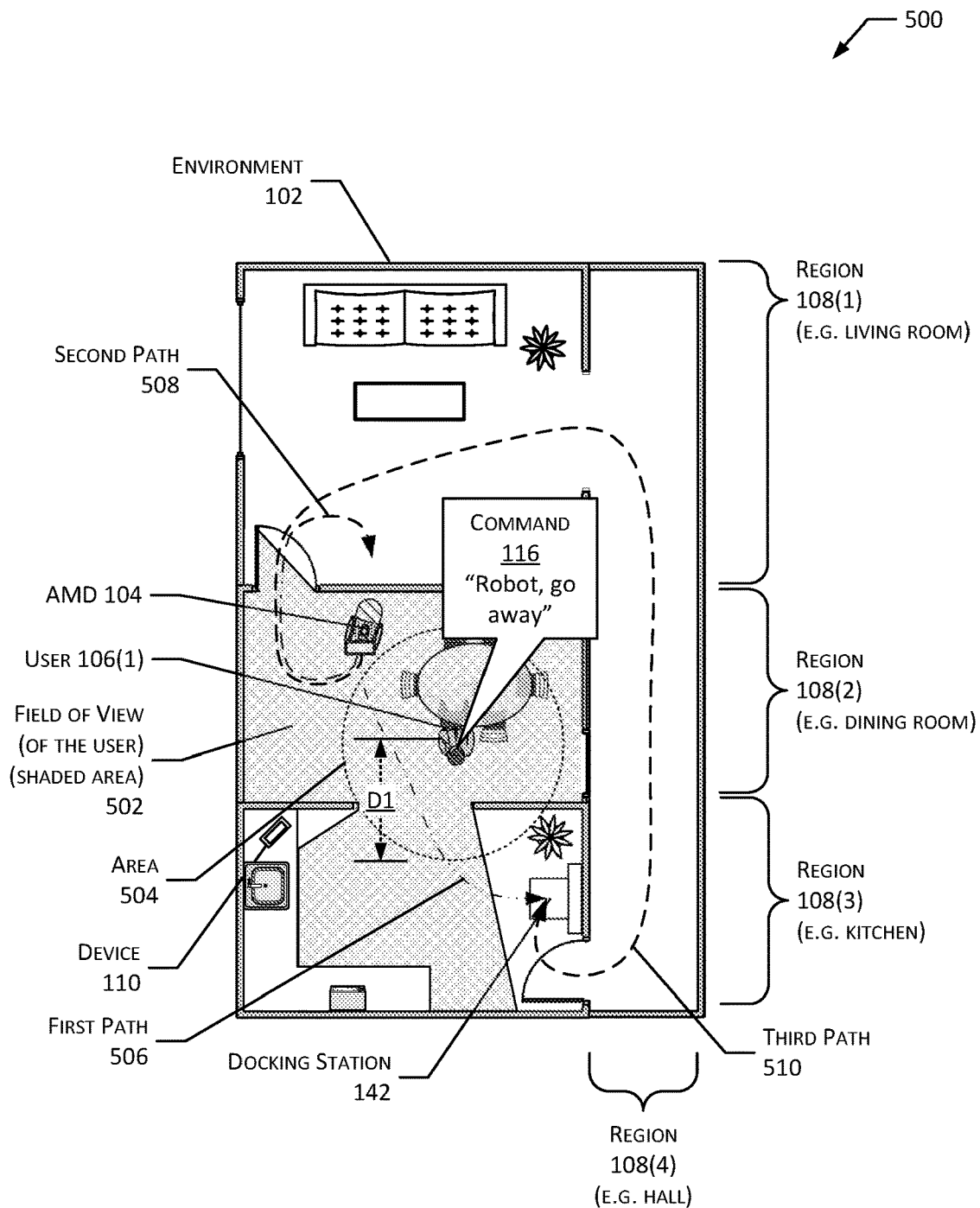
FIG. 5 illustrates the environment and possible paths for the AMD responsive to particular commands, according to some implementations.

FIG. 5 illustrates at 500 the environment 102 and possible paths for the AMD 104 responsive to particular commands, according to some implementations.

In this illustration, the user 106(1) is seated at a dining table in region 108(2), the dining room. The user 106 has a field of view (FOV) 502 that is indicated by a shaded area. For example, the user 106(1) is able to see partially into the region 108(1) and, if their head is turned, into the region 108(3) behind. The FOV 502 does not extend into the region 108(4) as the door to that region is closed.

The FOV 502 may be determined using a variety of techniques. For example, the FOV 502 may be determined as an area radiating from a location of the user 106 that is bounded by obstacles in an occupancy map 236. Continuing the example, determination may be visualized as rays extending from a centroid of the user 106 to a point on an occupancy map 236 that exceeds a threshold distance. In another example the FOV 502 may be determined as the solid angle directed along a line perpendicular from the head of the user 106 that extends to an object. The FOV 502 may take into consideration features such as doors, windows, and so forth. For example, the FOV 502 may consider whether a door is open or closed, whether a barrier between regions 108 is transparent or not, and so forth.

The system may include information such as minimum approach distance D1. The minimum approach distance D1 may be associated with a user 106, a particular entry in the command library 232, and so forth. The minimum approach distance D1 specifies how far, at a minimum, from the user 106 the AMD 104 is to be in any given scenario. For example, if the minimum approach distance D1 is 1 meter, then in any given interaction with the user 106, the AMD 104 will be at least 1 meter away from the user location. The minimum approach distance D1 may be specified in various units including, but not limited to meters, feet, and so forth. In some implementations, the user 106 may specify the minimum approach distance D1. For example, the user 106 may specify the minimum approach distance D1 as part of a setup routine. In other implementations the AMD 104 may determine this distance based on interactions with the user 106 over time. The minimum approach distance D1 can be adjusted dynamically by the AMD 104 based on its interactions with the user 106 or changed by the user 106 at any time. The minimum approach distance D1 can be the same for all users 106 in the environment 102 or may be unique to each user 106 in the environment 102. In some implementations, the minimum approach distance D1 may specify an area 504, with respect to an object such as the user 106, that the AMD 104 is to avoid traversing while moving. In this figure, the circular area 504 is defined by the minimum approach distance D1. In other implementations the minimum approach distance D1 may describe areas having different shapes, sizes, and so forth. During operation the autonomous navigation module 134 may consider one or more of the minimum approach distance D1 or the area 504 defined by the minimum approach distance D1 during route planning.

In this figure, the AMD 104 is located near the open doorway between the region 108(1) and the region 108(2). The user 106(1) issues the command 116 "robot, go away". In some implementations, at least a portion of the AMD 104 may turn towards the user 106 who is issuing, or within a threshold amount of time has issued, a command 116. For example, the AMD 104 may tilt a display screen towards the user 106, rotate the entire chassis such that the AMD 104 is pointed towards the user 106, and so forth. In some implementations if the AMD 104 is in motion when the user 106 issues a command 116 the AMD 106 may stop moving and turn towards the user 106 who is issuing the command 116. For example, when the user 106 utters the command 116, the AMD 104 may stop moving and turn so the chassis of the AMD 104 is pointed at the user 106.

The input data 128 comprises "go away" which the input processing module 130 determines is associated with the command data 132 <go_away> in the command library 232. The action which the command library 232 specifies for this command 116 is for the AMD 104 to move to a location which is in another region and outside of the FOV 502 of the user 106 without approaching closer than the minimum approach distance D1. Said another way, the AMD 104 will try to move out of sight without coming too close to the user 106.

To comply with the command data 132 the autonomous navigation module 134 may determine one or more destination locations and paths to reach those destination locations. The destination location may be selected to place the AMD 104 out of the way of expected traffic to avoid having the AMD 104 block or otherwise impede movement of the users 106, other AMDs 104, pets, and so forth in the environment 102.

The autonomous navigation module 134 may determine a first path 506 that extends from the current location of the AMD 104 in the region 108(2) to the docking station 142 located in region 108(3). The docking station 142 may be outside of the FOV 502 of the user 106(1). This first path 506 passes through the area 504 described by the minimum approach distance D1.

The autonomous navigation module 134 may determine a second path 508 that extends from the current location of the AMD 104 in the region 108(2) into a location within region 108(1) that is out of the FOV 502 of the user 106(1).

The autonomous navigation module 134 may determine a third path 510 that extends from the current location of the AMD 104 in the region 108(2) through region 108(1) and through region 108(4) to the docking station 142 in region 108(3).

The determination of the destination location and the path taken may take into consideration other information. For example, if the battery 112 of the AMD 104 is less than a threshold value, the destination location may be the docking station 142 which is able to recharge the battery 112. Some considerations, such as the minimum approach distance D1 may be disregarded or modified in certain circumstances. For example, if the available charge in the battery 112 is below a threshold value, the AMD 104 may use the shorter first path 506, passing through the area 504 described by the minimum approach distance D1 which would otherwise be disallowed.

In comparison, if the battery 112 has sufficient charge to take a longer path, but is below another threshold value, the autonomous navigation module 134 may use the third path 510, moving the AMD 104 quickly out of the user's 106 FOV 502 and to the docking station 142.

If the battery 112 does not need to be charged at the time of the command 116, the autonomous navigation module 134 may use the second path 508. The AMD 104 may then be moved to a location in the region 108(1) that is not within the FOV 502 of the user 106.

The autonomous navigation module 134 may be configured to attempt to reach the destination location, or alternative destination locations, if an obstacle is encountered. For example, if a door is closed the AMD 104 may determine an alternative path that avoids the closed door. If a threshold number of attempts to comply with the command 116 are reached, the AMD 104 may stop and present an error message using one or more of the output devices 138.

FIG. 6 depicts a portion of a command library 232 and command priority data 234, according to one implementation. The command library 232 associates input data 128 that is representative of the command 116 with command data 132 that is indicative of one or more actions 602. For example, the command 116 "robot stop" may produce input data 128 of "stop". The input data 128 "stop" is associated with the command data 132 for the action 602 of stopping all movement of the AMD 104 if the AMD is in motion or stopping an active task on the AMD 104 if the AMD 104 is not moving.

The input data 128 may include values for parameters that may be included in the command data 132. For example, the command 116 "robot, move left 2 meters" produces input data 128 of "move left 2 meters" which includes a value of 2 meters to specify the distance the robot is to move. As a result, the command data 132 may be determined comprising <move_left, distance=2.0>.

In some implementations compliance with a command 116 may be subject to an assessment of priority. The command priority data 234 may be used to determine whether command data 132 is to be generated, utilized, or otherwise considered and if so, the order in which the subsequent action 602 takes place. In one implementation as depicted here, the command priority data 234 associates command data 132, a currently active task 604, an input source 606, with a particular priority 608. The currently active task 604 may comprise data indicative of one or more tasks that are being performed, such as by the task modules 136. For example, the currently active task 604 may be "sentry", "finding user 106(2)" or "playing video content."

The input source 606 is indicative of where the command 116 originated from. The input source 606 may be a device outside the environment 102. For example, the user 106 may be somewhere else and use an application on a smartphone to communicate with the AMD 104 and provide the command 116. The input source 606 may be from the AMD 106 or sensors 124 onboard the AMD 104. For example, the utterance of the user 106 may be acquired using the microphone 346 on the AMD 104. The input source 606 may be another device 110 in the environment 102. For example, the input source 606 may be the device 110 that is connected to the network 140.

Continuing the example above, the sentry task may involve the AMD 104 moving to various regions 108 in the environment 102 and looking for anomalous conditions, presence of unidentified or unexpected users 106, and so forth. As illustrated in FIG. 6, the command priority data 234 may specify that while the sentry task is in progress a command 116 to "stop" and the associated command data 132 of <stop.movement> is given highest priority when provided by an input source 606 that is outside of the environment 102. In comparison, while the sentry task is in progress a command 116 to "stop" would still be complied with when the input source 606 is the microphone 346 on the AMD 104, but has a lower priority.

In some implementations the command data 132 that is associated with a relative movement may be associated with a location and orientation of the AMD 104 at a particular time. For example, if the AMD 104 is in motion and the user 106 issues the command 116 "robot, turn left", the time associated with the acquisition of the audio data 230 that included the wake word "robot" is determined. The orientation of the AMD 104 at that time may then be determined and used as the starting orientation for the command 116. For example, the AMD 104 may be moving on a curved path and is at point on that path when the user 106 says "robot turn left". The AMD 104 would turn to a heading that is 90 degrees left of the heading of the AMD 104 at the time the wakeword "robot" was acquired.

In some situations the command data 132 may interrupt an active task or other operation. The interrupted task or operation may then be resumed or abandoned. For example, while the AMD 104 is moving through a region 108 along a first path 506 when a user 106 issues a command 116 "robot move to the right". The AMD 104 may discontinue following the first path 506 and moves to a location that is a default distance to the right of the location of the AMD 104 at the time the wakeword "robot" was acquired. The AMD 104 may then continue with the previous task or operation, wait some period of time for an order from the user 106 and if nothing is received, continues with the previous task or operation, cancel the previous task or operation, or take other action.

In some implementations, other moveable components such as a moveable display 386 device, a mast, sensors 124, and so forth may be oriented to align with the chassis or body of the AMD 104. For example, if the user 106 issues a command 116 "robot turn left" then the AMD 104 would turn left 90 degrees and align the display 386 screen to be oriented in the same direction. For example, if the display screen is oriented vertically, a line orthogonal to a surface of the display 386 device would be parallel to a centerline of the chassis.

Some actions may comprise several other actions. For example, the command data 132 associated with the input data 128 "move left" may comprise turning left 90 degrees, moving forward 0.5 meter, and turning right 90 degrees.

Table 1 illustrates various actions 602, their respective association with input data 128, and the conditions during which the action is permissible.

TABLE 1

| Input Data 128 | Action(s) 602 | Conditions during which the action is permissible |
| --- | --- | --- |
| switch camera/show the other camera/use the other camera | Set current input from first camera to a second camera | Active task uses camera |
| raise mast/camera up /lift the camera | Raise extensible mast | Active task uses camera |
| Lower mast/camera down/ lower the camera | Lower the extensible mast | Active task uses camera |
| Look up/look down/look right/look left | Change camera angle as directed | Active task uses camera |
| Look at me/Face me | Point camera at user | Active task uses camera |
| Stop moving the screen | Stop movement of display screen | Any |
| Face me | Orient chassis towards user | No active task using camera |
| Move away | Move to a waiting location that is within FOV 502 of the user 106 or in the contiguous space, while avoiding the user 106. Remain at waiting location until new command received or time limit expires. | Any (except sentry) |

A command 116 of "stop" may result in different actions 602 based on the task or operation that the AMD 104 is performing at the time of the command 116. For example, if the AMD 104 is moving then "stop" may result in the AMD 104 coming to an immediate halt as quickly as possible. If the AMD 104 is involved in an active task for a user, the AMD 104 will remain at the location where it comes to rest until the active task is completed or the user 106 issues another command. If the AMD 104 is performing a task that is not initiated by a user 106, such as a scheduled task, the AMD 104 may remain stationary until another task calls for movement, another command 116 is determined, until a time period expires, until the battery 112 charge level is below a threshold value, and so forth.

In another example, if the AMD 104 is not moving (stationary) and performing a task such as playing content on the display screen, the command 116 of "stop" would result in the playing of the content to stop.

The AMD 104 may be configured to identify a user 106. For example, one or more of facial recognition, voice recognition, gait analysis, a password, and so forth may be used to distinguish one user 106 from another. In some situations the AMD 104 may only perform a command 116 from a particular user 106, or from a particular group of users. For example, the AMD 104 may be used to add, edit, and review a personal task list. A command 116 to "show my task list" may be limited to showing only the personal task list for the user 106 who issued the command 116, or another user 106 who has been authorized to see that information.

Certain tasks may result in particular actions 602 or modifications to existing actions 602. For example, if the AMD 104 is performing a sentry task in which it travels through the environment and determines the presence and identity of users 106, some commands 116 may be unavailable to unidentified users 106. Continuing the example, an identified user 106 who is known to the AMD 104 may be able to issue the command 116 "stop" to which the AMD 104 would then comply. However, an unidentified user 106 who issues the same command 116 may not be able to initiate the stop action 602, and instead the AMD 106 would attempt to identify that unidentified user 106. If the user remains unidentified, the AMD 104 may then proceed to follow the unidentified user 106, generate a notification, or take other action.

Time out periods may vary between commands 116. For example, the "stop" command may result in no movement for 5 minutes while "go away" may exclude the AMD 104 from a particular area in the environment 102 for 1.5 hours. For example, a particular region 108 or portion thereof may be designated as an excluded area. The AMD 104 may be prohibited from autonomously traversing the excluded area. This limitation may be permanent, or temporary. For example, a user 106 may designate a permanently excluded area within which the AMD 104 is never permitted to enter autonomously. In another example, the "go away" command may result in an excluded area being designated for a length of time, such as minutes or hours, or until a particular date and time. During operation, the autonomous navigation module 134 may take into consideration the excluded area (s). Possible paths for navigation which traverse the excluded area(s) may be disregarded from consideration. As a result, the AMD 104 would not autonomously navigate into the excluded areas while the exclusion is in effect. As described above, the AMD 104 may traverse an excluded area if ordered by a user to do so.

In one implementation, a predetermined time limit may specify for how long an excluded area will remain in effect. When the predetermined time limit expires, the AMD 104 is free to traverse the previously excluded area.

The AMD 104 may be permitted to enter an excluded area under certain circumstances, such as in response to a command by the user 106 to do so, when following the user 106 who moves into an excluded area, and so forth. In other implementations the AMD 104 may never be permitted to enter the excluded area.

In situations where a command 116 is unrecognized, invalid, or otherwise cannot be performed, the output devices 138 may be used to provide output to the user 106. For example, a particular sound may be presented using a speaker.

Figure 7:
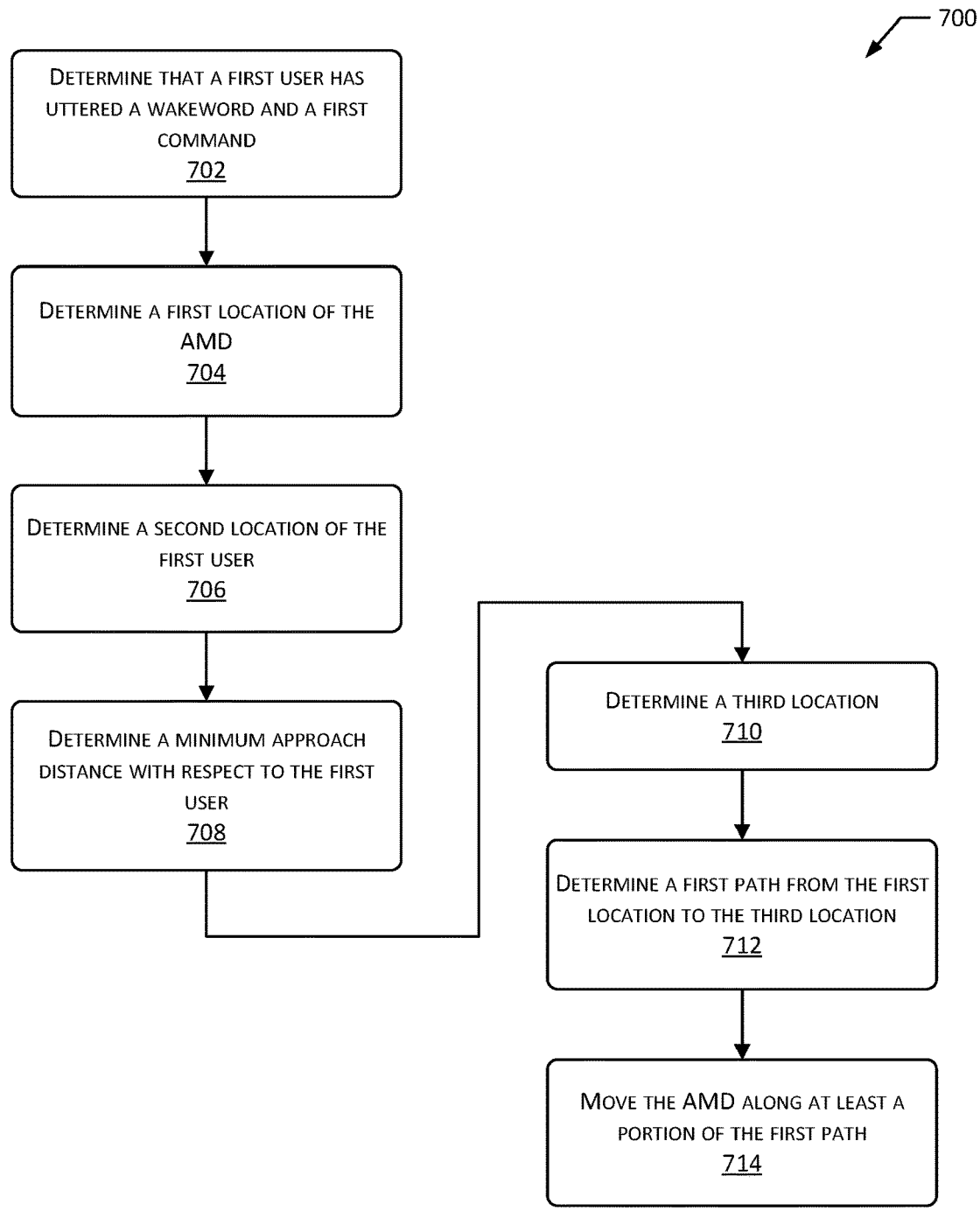
FIG. 7 is a flow diagram of a process to move the AMD responsive to a "go away" command, according to some implementations.

FIG. 7 is a flow diagram 700 of a process to move the AMD responsive to a "go away" command, according to some implementations. The process may be implemented at least in part by one or more of the processors 118 on the AMD 104, the servers 144, the docking station 142, or other devices 146.

At 702, at a first time, a determination is made that the first user 106(1) has issued a command 116. For example, the first user 106(1) may utter "robot, go away". The speech processing module 220 determines the presence of the wakeword "robot" and proceeds to process the raw audio data 224 to determine the input data 128. The input data 128 comprising "go away" is then processed by the input processing module 130 to determine the command data 132 of <go_away>. The command data 132 comprises a command that instructs the AMD 104 to leave a vicinity of the first user 106(1).

At 704 a first location of the AMD 104 is determined. For example, the autonomous navigation module 134 may determine the current location of the AMD 104 in the environment 102. The first location is within a particular region 108, such as a particular room.

At 706 a second location of the first user 106(1) is determined. For example, the first user 106(1) may be in the same region 108 as the AMD 104. The second location may be determined using sensor data 126 obtained by the AMD 104, the device(s) 110, and so forth. For example, a camera 344 on the AMD 104 may acquire an image of the first user 106(1). The image may be processed to determine the location of the first user 106(1).

At 708 a minimum approach distance D1 with respect to the first user 106(1) is determined. For example, a default minimum approach distance D1 may be retrieved from storage. In another example, a minimum approach distance D1 may be associated with the particular first user 106(1).

At 710 a third location is determined. The third location is indicative of the destination location the AMD 104 will attempt to reach, responsive to the command data 132. In some situations, the third location may be in a region 108 that is different from the region 108 in which the first location is located, and which is outside of the FOV 502 of the first user 106(1). For example, the third location may be a location deemed to be out of sight of the first user 106.

In one implementation the third location may be specified to be in a region 108 that differs from the first location of the AMD 104. For example, if the AMD 104 is in region 108(1), the third location may be in the region 108(2).

In another implementation the third location may be specified to be in a region 108 that differs from the second location of the first user 106. For example, if the AMD 104 is in region 108(1) and the first user 106 is in region 108(2), the third location may be in the region 108(3) or in another location within region 108(1).

Various techniques may be used to determine the third location. For example, the third location may comprise a location that is in a region 108 that is adjacent to the region 108 in which the AMD 104 or the first user 106 are located at the time of the command 116. In another example, the third location may comprise a location that is in a region 108 that is non-adjacent.

In one implementation the third location may be determined using the occupancy map 236 to find an obstacle that provides concealment from the user 106. The occupancy map 236 may be determined based on data from the sensors 124. The occupancy map 236 is indicative of one or more obstacles in the environment 102. From the one or more obstacles, a first obstacle may be determined that has a minimum height and a minimum width. The minimum height is greater than or equal to a height of the AMD 104 and the minimum width is greater than or equal to a width of the AMD 104. In some implementations the first obstacle may be determined based on distance. For example, the obstacle closest to the first location of the AMD 104 that meets these criteria may be selected. To determine the third location, in one implementation a line may be extended from the second location of the first user 106 through a center of the first obstacle as indicated by the occupancy map 236. The third location may comprise a location along this line that is on the side of the first obstacle opposite the first user 106. The third location is determined such that the first obstacle is between the first location and the third location. As a result, the first obstacle will obscure the ability of the first user 106 to see the AMD 104.

In another implementation the third location may be determined by introducing certain minimums on the path taken by the AMD 104 as it enters another region 108. The first path from the first location to the third location traverses at least two regions 108 and has a first portion in the first region 108 and a second portion in the second region 108. The third location may comprise a location that is defined based on one or more of a minimum number of turns, minimum angle for those turns, movement for a specified distance, and so forth. For example, the third location may be the location where the AMD 104 arrives after entering the second region 108, making a left or right turn of at least 45 degrees, and travelling a distance of at least 2 meters. Continuing the example, the path to the third location may include a portion that comprises at least one turn and a first length.

The third location may be designated in advance, based on a random selection within the occupancy map 236, and so forth. Once determined, the third location may be tested to determine if the AMD 104 should remain or move to a fourth location.

In one implementation the testing of the third location may involve the AMD 104 determining if the first user 106 is visible. For example, the AMD 104 may include a camera 344 that generates image data. At the third location, first image data may be acquired. Continuing the example, the AMD 104 may pan the camera 344 to gather first image data of the region 108. Based on the first image data, a determination is made as to the presence of the first user 106 in the first image data. For example, a facial recognition system may process the first image data to determine if the first user 106 is depicted in the first image data. If the first user 106 is not depicted, the AMD 104 may remain at the third location. If the first user 106 is depicted, the AMD 104 may then move to the fourth location. In one implementation, the fourth location may be determined as being at least a first distance from the third location. Second image data may be acquired at the fourth location. The second image data may be processed to determine an absence of the first user. For example, if the first user 106 is not depicted in the second image data, they may be deemed to be absent. In another implementation, if the first user 106 is not identified in the second image data, they may be deemed to be absent.

In some situations, the third location may be determined by the AMD 104 travelling to an arbitrary point in another region 108. While travelling, the AMD 104 determines when the first user 106 is no longer visible as described above. That point where the first user 106 is no longer visible may be designated as the third location.

In another implementation the testing of the third location may involve the AMD 104 using information about a wireless signal of a wireless device that is associated with the first user 106. For example, the first user 106 may have a smartphone, table computer, wearable device and so forth. During enrollment, the first user 106 may register that device, obtaining information such as a media access control (MAC) address, device identifier, and so forth.

At the third location, a radio receiver on the AMD 104 determines a first received signal strength value of a first signal from the wireless device. For example, a WiFi packet may be received by the network interface 120 on the AMD 104, and the MAC address of the packet used to determine that the source is a smartphone associated with the first user 106. A first received signal strength value of this packet may be determined.

If the first received signal strength value is greater than a threshold value, the AMD 104 may remain at the third location. If not, the AMD 104 may determine a fourth location that is at least a first distance from the third location. The AMD 104 then moves to the fourth location. The fourth location may be a location where a previously measured second received signal strength value is lower than the threshold value. In another implementation, a determination may be made at a location along the path, that a second received signal strength value is lower than the threshold value. The AMD may then stop between the location and the fourth location.

In some situations, the third location may be determined by the AMD 104 travelling to an arbitrary point in another region 108. While travelling, the AMD 104 may determine the third location at the point corresponding to when the received signal strength value drops below the threshold value.

In some situations, the third location may be determined based on other information, such as available charge of the battery 112. For example, if the available charge in the battery 112 is less than a threshold value, the third location may be designated as the docking station 142. At the docking station 142, the AMD 104 may then recharge the battery 112.

At 712 a first path from the first location to the third location is determined. A minimum approach distance D1 may be determined with respect to the first user 106. The AMD 104 will avoid moving to any point that is within the minimum approach distance D1 of the first user 106. For example, a default minimum approach distance D1 may be retrieved from storage. The autonomous navigation module 134 will use the minimum approach distance D1 to determine a first path from the first location to the third location. The first path may comprise a plurality of locations. A distance between every location along the first path and the second location is equal to or greater than the minimum approach distance D1.

At 714 the AMD 104 is moved along the first path, using the one or more motors 114, to the third location. As described above, the third location may be evaluated to determine whether the AMD 104 should remain there until further commands 116 are determined.

In some implementations, certain commands 116 will restrict movement of the AMD 104 in various ways. For example, the command data 132 for <go_away> may result in the AMD 104 excluding an area, such as a particular region 108, from path planning for a specified length of time. Continuing the example, if the command 116 was uttered while the AMD 104 was in the region 108(2), the region 108(2) may be designated as an excluded area for a threshold amount of time. The autonomous navigation module 134 of the AMD 104 may be constrained to avoid using paths for movement that traverse the region 108(2) for the next 60 minutes. In this example, if the AMD 104 were at the docking station 142 while the exclusion from the <go_away> command data 132 is in effect and a command 116 was issued to have the AMD 104 proceed to region 108(1), the autonomous navigation module 134 may determine and use a path that avoids passing through the region 108(2).

Subsequent commands 116 may override an excluded area or other limitation imposed by command data 132. For example, ten minutes after issuing the "robot, go away" command 116 if the first user 106(1) issues a command 116 "robot, come here" while still in region 108(2), the exclusion may be overridden or rescinded and the AMD 104 would travel to the first user 106(1) in the region 108(2). Continuing the example, once the first user 106(1) is through with the AMD 104, the AMD 104 would leave the excluded area and remain out until expiration of a designated length of time. In another example, the command 116 to re-enter the excluded area may result in the excluded area being discontinued at that time. As a result, the AMD 104 may autonomously navigate through the previously excluded area.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising, at least in part by an autonomous mobile device (AMD):
   receiving, by the AMD at a first time, first speech input from a first user, wherein the AMD is located at a first location;
   determining a second location of the first user;
   determining, at the second location, a first received signal strength value of a first signal from a wireless device associated with the first user;
   determining a third location that is at least a first distance from the second location, wherein a second received signal strength value associated with the wireless device, at the third location, is lower than the first received signal strength value;
   determining a first path from the first location to the third location; and
   moving the AMD along at least a portion of the first path.

2. The method of claim 1, wherein the second location is in a first region; and further comprising:
   determining that the first speech input corresponds to a first command instructing the AMD to leave a vicinity of the first user; and
   responsive to the first command, determining that the AMD is excluded from autonomously traversing the first region until one or more of:
      expiration of a time limit, or
      receiving, at a second time, second speech input that corresponds to a second command for the AMD.

3. The method of claim 1, further comprising:
   determining an occupancy map of an environment that is indicative of one or more obstacles in the environment;
   determining, from the one or more obstacles, a first obstacle with a first height and a first width, wherein the first height is less than or equal to a height of the AMD and the first width is less than or equal to a width of the AMD; and
   determining the third location such that the first obstacle is between the first location and the third location.

4. The method of claim 1, wherein the first path has a first portion in a first region and a second portion in a second region; and
   further wherein the second portion comprises at least one turn and a first length.

5. The method of claim 1, further comprising:
   receiving, by the AMD at a second time, second speech input from the first user;
   determining that the second speech input corresponds to a first command instructing the AMD to leave a vicinity of the first user;
   acquiring, using a camera, first image data at the third location;
   determining, based on the first image data, presence of the first user;
   determining a fourth location that is at least a second distance from the third location;
   determining a second path from the third location to the fourth location;
   moving the AMD to the fourth location along at least a portion of the second path;
   acquiring second image data at the fourth location; and
   determining, based on the second image data, absence of the first user.

6. The method of claim 1, further comprising:
   determining that the first received signal strength value is greater than a threshold value;
   determining a fourth location that is at least a second distance from the third location;
   determining a second path from the third location to the fourth location;
   moving, using one or more motors, the AMD to the fourth location along at least a portion of the second path;
   determining, at a fifth location along the second path, that a third received signal strength value associated with the wireless device is lower than the threshold value; and
   stopping the AMD between the fifth location along the second path and the fourth location.

7. A method comprising:
   receiving, at a first time, first speech input from a first user, wherein a device is located at a first location;
   determining, at the first location, a first received signal strength value of a first signal from a wireless device associated with the first user;
   determining a second location that is a first distance from the first location, wherein a second received signal strength value associated with the wireless device, at the second location, is lower than the first received signal strength value;
   determining a first path from the first location to the second location; and
   moving the device along at least a portion of the first path.

8. The method of claim 7, further comprising:
   determining the first user is in a first region;
   determining the first location is in the first region; and
   determining, based on the first speech input, that the device is excluded from autonomously traversing the first region until one or more of:
      expiration of a time limit, or
      receiving, at a second time, second speech input that corresponds to a command instructing the device.

9. The method of claim 7, further comprising:
   determining the first location is in a first region;
   determining the second location is in a second region;
   determining the first user is in a third region; and
   determining, based on the first speech input, that the device is excluded from autonomously traversing the third region until one or more of:
      expiration of a time limit, or
      receiving, at a second time, second speech input that corresponds to a command for the device.

10. The method of claim 7, further comprising:
    determining a third location of the first user;
    determining an occupancy map that is indicative of one or more obstacles in an environment; and
    determining the second location such that at least one obstacle as indicated by the occupancy map is between the second location and the third location.

11. The method of claim 7, wherein the first path has a first portion in a first region and a second portion in a second region; and
    further wherein the second portion comprises at least one turn and a first length.

12. The method of claim 7, further comprising:
receiving, by the device at a second time, second speech input from the first user;
determining that the second speech input corresponds to a command instructing the device to leave a vicinity of the first user;
acquiring, using a camera, first image data at the second location;
determining, based on the first image data, presence of the first user;
determining a third location that is at least a second distance from the second location;
determining a second path from the second location to the third location;
moving the device to the third location along at least a portion of the second path;
acquiring second image data; and
determining, based on the second image data, absence of the first user.

13. The method of claim 7, further comprising:
determining that the first received signal strength value is greater than a threshold value;
determining a third location that is at least a second distance from the second location;
determining a second path from the second location to the third location;
moving, using one or more motors, the device to the third location along at least a portion of the second path;
determining, at a fourth location along the second path, that a third received signal strength value associated with the wireless device is lower than the threshold value; and
stopping the device between the fourth location along the second path and the third location.

14. The method of claim 7, further comprising:
determining a third location of the first user; and
determining a second distance that defines an area with respect to the third location;
wherein a third distance between each location along the first path and the second location is greater than or equal to the second distance.

15. A device comprising:
one or more memories storing first computer-executable instructions; and
one or more processors to execute the first computer-executable instructions to:
receive, at a first time, first speech input from a first user, wherein the device is at a first location;
determine a second location of the first user;
determine a first distance, wherein the first distance defines an area around the second location;
determine, at the second location, a first received signal strength value of a first signal from a wireless device associated with the first user;
determine a third location that is at least a second distance from the second location, wherein a second received signal strength value associated with the wireless device is lower than the first received signal strength value;
determine a first path from the first location to the third location; and
move the device along at least a portion of the first path.

16. The device of claim 15, the one or more processors to execute the first computer-executable instructions to:
responsive to the first speech input, designate a first region as an excluded area that the device is prohibited from autonomously traversing until a second time;
receive, at a third time that is after the first time and before the second time, a command that instructs the device to move to a second region;
determine, responsive to the command, a second path to the second region, wherein the second path avoids traversing the first region; and
move the device along at least a portion of the second path.

17. The device of claim 15, the one or more processors to execute the first computer-executable instructions to:
determine an occupancy map of an environment that is indicative of one or more obstacles in the environment; and
determine, from the one or more obstacles, a first obstacle with a first height and a first width, wherein the first height is greater than or equal to a height of the device and the first width is greater than or equal to a width of the device and wherein the first obstacle is between the first location and the second location.

18. The device of claim 15, wherein the first path has a first portion in a first region and a second portion in a second region; and
further wherein the second portion comprises at least one turn and a first length.

19. The device of claim 15, wherein the one or more processors to execute the first computer-executable instructions to:
acquire first image data at the third location;
determine, based on the first image data, presence of the first user;
determine a fourth location that is at least a third distance from the third location;
determine a second path from the third location to the fourth location;
move the device to the fourth location along at least a portion of the second path;
acquire second image data at the fourth location; and
determine, based on the second image data, absence of the first user.

20. The device of claim 15, the one or more processors to execute the first computer-executable instructions to:
responsive to a first command, determine that the device is excluded from autonomously traversing a first region until expiration of a time limit.

* * * * *